(12) United States Patent
Gayton et al.

(10) Patent No.: US 6,240,088 B1
(45) Date of Patent: *May 29, 2001

(54) METHOD FOR TWO-STAGE DATA TRANSMISSION

(75) Inventors: Donald W. Gayton; Andrei Godoroja, both of North Vancouver; Randy T. Tkatch, Burnaby, all of (CA)

(73) Assignee: Glenayre Electronics, Inc., Charlotte, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,950

(22) Filed: Jun. 2, 1998

(51) Int. Cl.⁷ .......................... H04L 12/28; H04L 12/56; H04J 3/24; H04Q 1/30
(52) U.S. Cl. .......................... 370/389; 370/394; 370/473; 340/311.1
(58) Field of Search .................... 370/278, 389, 370/394, 470, 471, 473, 474; 340/825.54, 311.1; 710/31, 34; 455/49.1, 54.2, 31.2, 31.3, 413; 379/93.01, 93.17, 93.24, 100.08

(56) References Cited

U.S. PATENT DOCUMENTS

| | | | |
|---|---|---|---|
| 5,212,477 | * 5/1993 | Indekeu et al. | 340/825.44 |
| 5,392,452 | * 2/1995 | Davis | 455/38.1 |
| 5,630,207 | * 5/1997 | Gitlin et al. | 455/54.1 |
| 5,706,211 | * 1/1998 | Beletic et al. | 364/514 R |
| 5,708,781 | * 1/1998 | Chiashi et al. | 395/200.17 |
| 5,737,332 | * 4/1998 | Corrigan et al. | 370/394 |
| 5,905,777 | * 5/1999 | Foladare et al. | 379/90.01 |

* cited by examiner

*Primary Examiner*—Alpus H. Hsu
*Assistant Examiner*—Duc Ho
(74) *Attorney, Agent, or Firm*—Christensen O'Connor Johnson Kindness PLLC

(57) ABSTRACT

A method is disclosed for sequential transmission of at least two sub-packages of the data package from an electronic communication transmitter to an electronic communication receiver. A first sub-package of the data package in a form comprehensible to the user of the electronic communication receiver is transmitted from the electronic communication transmitter to the electronic communication receiver. The first sub-package of the data package includes identifying information pertaining to a second sub-package of the data package, with the first sub-package of the data package having less data content than that of the second sub-package of the data package. The electronic communication receiver provides the user thereof with the choice of whether to have the second sub-package of the data package transmitted by the electronic communication transmitter. Transmission instructions are transmitted from the electronic communication receiver to the electronic communication transmitter in response to an affirmative selection by the user of the electronic communication receiver to the choice of whether to have the second sub-package of the data package transmitted. The second sub-package of the data package is transmitted from the electronic communication transmitter upon receipt by the electronic communication transmission instruction from the electronic communication receiver.

21 Claims, 2 Drawing Sheets

METHOD FOR TWO-STAGE DATA TRANSMISSION

FIELD OF THE INVENTION

The invention relates to data transmission, and more specifically, relates to sequential transmission of at least two portions of a data package.

BACKGROUND OF THE INVENTION

Narrow-band Personal Communications Systems (NPCS), or alternatively two-way paging, is an ideal platform for extending electronic mail (E-mail) or other types of data transmission to wireless devices such as pagers. An E-mail sender can use existing E-mail tools and the existing E-mail address of a subscriber to transmit data to the subscriber. The E-mail subscriber can designate, in his E-mail account, that E-mail communications be forwarded to the subscriber's two-way pager. The E-mail subscriber, upon receiving the E-mail forwarded from his E-mail account to the two-way pager can send a response back to the sender using the E-mail address of the sender that is included as part of standard E-mail protocols.

More specifically, the NPCS system connects to an existing E-mail network through an E-mail gateway or interface module. The E-mail gateway uses E-mail protocols, such as Simple Mail Transfer Protocol (SMTP) to receive E-mail data packages from senders and to return responses to the senders from the E-mail recipients. If the E-mail recipient has designated that his E-mail is to be forwarded to a two-way pager, the E-mail gateway processes the E-mail data package and forwards it to paging infrastructure using existing paging protocols.

A major problem with the above interface between E-mail systems and two-way pagers is that the E-mail sender can transmit an excessively large message or other data to the two-way pager of the recipient. The receipt of this excessively large amount of data can be costly to the recipient and can cause RF channel delays and unpredictable RF statistics.

One current method attempting to handle the problem of excessive data transmission is by limiting the message size transmittable to the two-way pager. This method has problems. First, the recipient has no knowledge that the message they receive on their two-way pager has been truncated. The recipient may thus not be aware that additional data was not received. Furthermore, the recipient has no control over the data truncation besides agreeing to allow it to occur.

Another existing method is to allow larger data transmissions to occur, but to charge a premium for data transmission over a predetermine size. Because there is no truncation of the data, the recipient must pay a premium for larger data packages, even if they are "junk E-mail." Additionally, because truncation is lacking, the larger data transmissions will cause RF channel delays and unpredictable RF statistics.

A need thus exists for a method of transmission of large amounts of data to a wireless device, such as a pager, where no large amounts of data are transmitted in a single occurrence on the RF channel.

A further need exists for the above-type of method in which potentially large amounts of data are divided into smaller data sub-packages that can be better controlled by the two-way paging infrastructure.

An additional need exists for the above-type of method in which the prevention of transmission of large amounts of data results in the receipt of messages by all two-way pager subscribers in a timely manner.

Yet another need exists for the above-type of method in which the protocol for the division of the large amounts of data into smaller sub-packages, such as the size of the smaller data sub-packages, can be varied.

An additional need exists for the above-type of method in which the two-way pager user can control the number of the data sub-packages sent, and therefore the cost, if the charge of the data transmission is on a data-amount basis.

A further need exists for the above-type of message in which the additional data sub-package sent provides sufficient information for the two-way pager user to ascertain the importance of the message, and thus of the subsequent data sub-packages that have not been sent.

SUMMARY OF THE INVENTION

A method is disclosed for sequential transmission of at least two sub-packages of a data package from an electronic communication transmitter to an electronic communication receiver is disclosed. A first sub-package of the data package in a form comprehensible to the user of the electronic communication receiver is transmitted from the electronic communication transmitter to the electronic communication receiver. The first sub-package of the data package includes identifying information pertaining to a second sub-package of the data package. The first sub-package of the data package has less data content than that of the second sub-package of the data package. The electronic communication receiver provides the user thereof with the choice of whether to have the second sub-package of the data package transmitted to the user by the electronic communication transmitter. Transmission instructions are then transmitted from the electronic communication receiver to the electronic communication transmitter in response to an affirmative selection by the user of the electronic communication receiver to the choice of whether to have the second sub-package of the data package transmitted. The second sub-package of the data package is transmitted from the electronic communication transmitter upon receipt by the electronic communication transmitter of the electronic communication transmission instruction from the electronic communication receiver.

The second sub-package of the data package can be received at either the electronic communication receiver or at a receiving device other than the electronic communication receiver. When the receiving device is other than the electronic communication receiver, it can be an electronic voice mail box with the second sub-package of the data package being a voice message or a text-to-voice message. The receiving device can also be a facsimile machine, with the second sub-package of the data package being a facsimile transmission. Alternatively, the receiving device can be an electronic text mail box with the second sub-package of the data package being a text message.

Most preferably, the electronic communication receiver is a pager, and the identifying information of the first portion of the data package denotes at least one of the subject, originating entity, originating location, data size, portion of the content, file name, and/or file type of the second sub-package of the data package.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
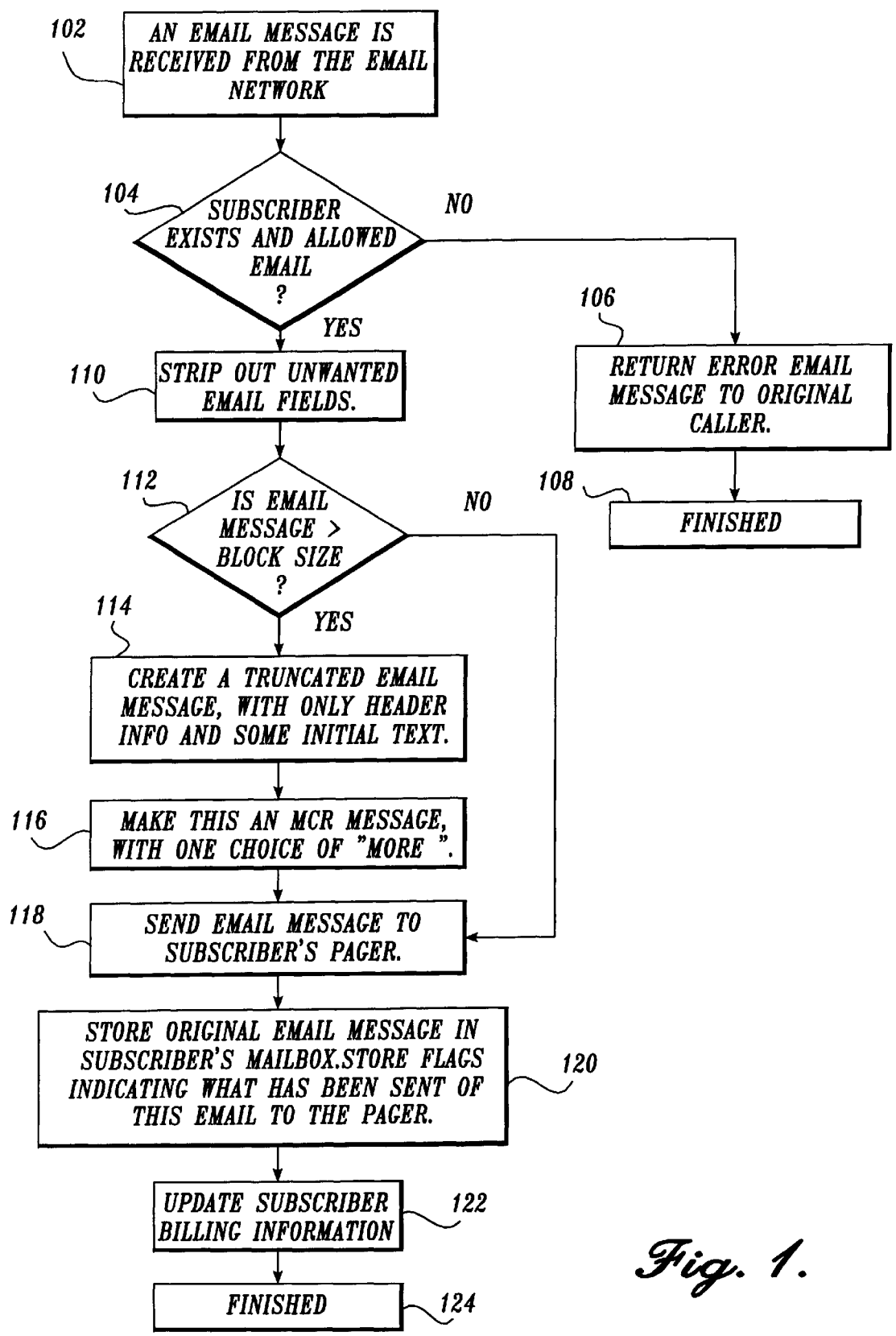
FIG. 1 is a flowchart depicting the initial receipt and processing by the paging infrastructure of an E-mail data package from an E-mail gateway, followed by transmission of an initial MCR message to a two-way pager as shown.

The present invention pertains to sequential data transmission of at least two sub-packages of a data package from an electronic communication transmitter to an electronic communication receiver. While the following description employs an E-mail system as the electronic communication transmitter, a two-way paging system as the electronic communication receiver, and E-mail data as the data package, it is understood that these components are only exemplary in nature. For example, instead of an E-mail system, the electronic communication transmitter can be a wired or wireless telephone system, an information service on the Internet or an intranet for a company. The electronic communication receiver can be an E-mail voice mail box, an E-mail text mail box, or a facsimile machine. Additionally, the data package can be a voice message, a text-to-voice message, a facsimile transmission or a text message.

The method of the present invention as described below is implemented in the E-mail gateway employing the Multiple Choice Response (MCR) feature of the two-way paging infrastructure. MCR is used in two-way paging systems to allow subscribers to respond to a message sent by a caller using the back channel (the RF channel that the pager uses to send data back to the paging infrastructure). Employing MCR, the caller formulates a message to the two-way pager subscriber, usually in the form of a multiple choice question. The caller thus dictates the set of responses that the two-way pager subscriber may choose. The message with its Multiple Choice Responses is sent to the two-way pager with an over-the-air protocol that clearly identifies the Multiple Choice Responses to the two-way pager. The two-way pager then displays the entire message, with a mechanism that allows the subscriber to scroll through the possible responses. When the two-way pager subscriber chooses a response to transmit back to the caller, the two-way pager sends only the index of the response chosen back to the caller. For example, if the second response was chosen, the index number 2 would only be sent to the caller, thus minimizing the amount of data sent on the back channel. The two-way paging infrastructure, having stored the original message, would reconstruct the response text from the index number, in this case 2, transmitted over the back channel such that the caller would receive a returned message consisting of the response text, not the index number.

Employing the method of the present invention, when an E-mail data package is received by a two-way pager, having been forwarded from the E-mail account of the two-way pager subscriber in a manner known in the art, the size of the E-mail data package is determined. If the size of the E-mail data package is below a predetermined value, the entire E-mail data package is forwarded to the two-way pager of the subscriber. If the size of the E-mail data package exceeds the predetermined value, only a portion of the E-mail data package is transmitted to the two-way pager. The content of this first portion (or sub-package) of the E-mail data package can include, for example, information denoting subject matter, priority, originating entity, originating location, data size, a portion of the data content, file name, and/or file type. The first sub-package of this E-mail data package is converted into an MCR response message with there preferably being only one response choice having a single response index and a single response text such as, for example "more" or "next." The two-way pager subscriber, upon seeing the first sub-package of the E-mail data package, can make an informed decision regarding the importance of viewing one or more of the additional sub-packages of the E-mail data package. If the two-way pager subscriber selects the single response choice of the MCR message, the index number is transmitted via the back channel to the E-mail data sub-package sender. The index number thus is transmitted through the paging infrastructure and the E-mail gateway. The E-mail gateway, upon receipt of the response index number transmits the second sub-package of the E-mail data package to the two-way pager through the E-mail gateway and the paging infrastructure. As in the case of the first sub-package of the E-mail data package, this second sub-package of the E-mail data package will have a predetermined size. If, after receipt of the second sub-package of the E-mail data package by the two-way pager, there is still data remaining that has not been transmitted to the two-way pager, the second sub-package of the E-mail data package would also be converted to an MCR message with a single response choice. The above protocol would be repeated until the two-way pager subscriber has either received the entire E-mail data package, or, at some point during the procedure, has elected not to respond to the response choice which would result in the remaining sub-package or sub-packages of the E-mail data package not being transmitted to the two-way pager.

Preferably, the E-mail gateway will keep the original E-mail data package, as well as the status of the sub-packages of the E-mail data package that have been sent to the two-way pager subscriber. In order to purge old messages, a time-out is associated with the E-mail data package. Furthermore, the E-mail gateway and the paging infrastructure preferably provide call detail records to the carrier's billing system so that the two-way pager subscriber can be billed for the separate sub-packages of the E-mail data package that they receive on a cost per sub-package basis.

Referring to FIG. 1, the initial receipt and processing by the paging infrastructure of an E-mail data package from an E-mail gateway, followed by transmission of an initial MCR message to a two-way pager is shown. At block 102, an E-mail data package is received by the paging protocol from the E-mail gateway. Block 104 is a decision block ascertaining the existence of the two-way pager subscriber and whether the two-way pager subscriber is allowed E-mail. If the answer to either of these queries is "no" then, as shown in block 106, a return error E-mail data package is transmitted to the E-mail sender through the E-mail gateway. The method of FIG. 1 would then terminate at block 108. If, however, at block 104, the two-way pager subscriber does exist and is allowed E-mail, i.e., the answer to both queries is "yes," the method proceeds to block 110. At block 110, unwanted E-mail fields that have been predetermined to be undesirable are removed. These unwanted E-mail fields can include, for example, mail server diagnostic information. At block 112 it is ascertained whether the E-mail data package is greater than a predetermined Block Size. If the E-mail data package is not greater than the predetermined Block Size, i.e., if the answer to this query is "no", the entire E-mail data package is transmitted to the two-way pager of the subscriber at block 118. If, on the other hand, the E-mail data package is greater than the Block Size, i.e., if the answer to the query at block 112 is "yes", then, at block 114, the E-mail data package is truncated into a first sub-package and a second sub-package. The first sub-package includes, for example, one or more of the subjects, originating entity, originating location, data size, portion of the content, file name, and/or file type. At block 116, the first sub-package of the E-mail data package truncated at block 114 is converted into an MCR message with, preferably, a single text response and associated single response index for back channel transmission. At block 118 the first sub-package of the E-mail data package is transmitted to the two-way pager of the subscriber. As shown in block 120, the entire original E-mail data package is stored in the E-mail mail box of the two-way pager subscriber. Preferably, store flags are employed that indicate the sub-packages of the E-mail data package (e.g., the first sub-package for the first transmission) that have been transmitted to the two-way pager. The billing information of the two-way pager subscriber is updated at block 122 to include the cost associated with the transmission of the first sub-package of the E-mail data package. Subsequently, this program terminates at block 124.

Figure 2:
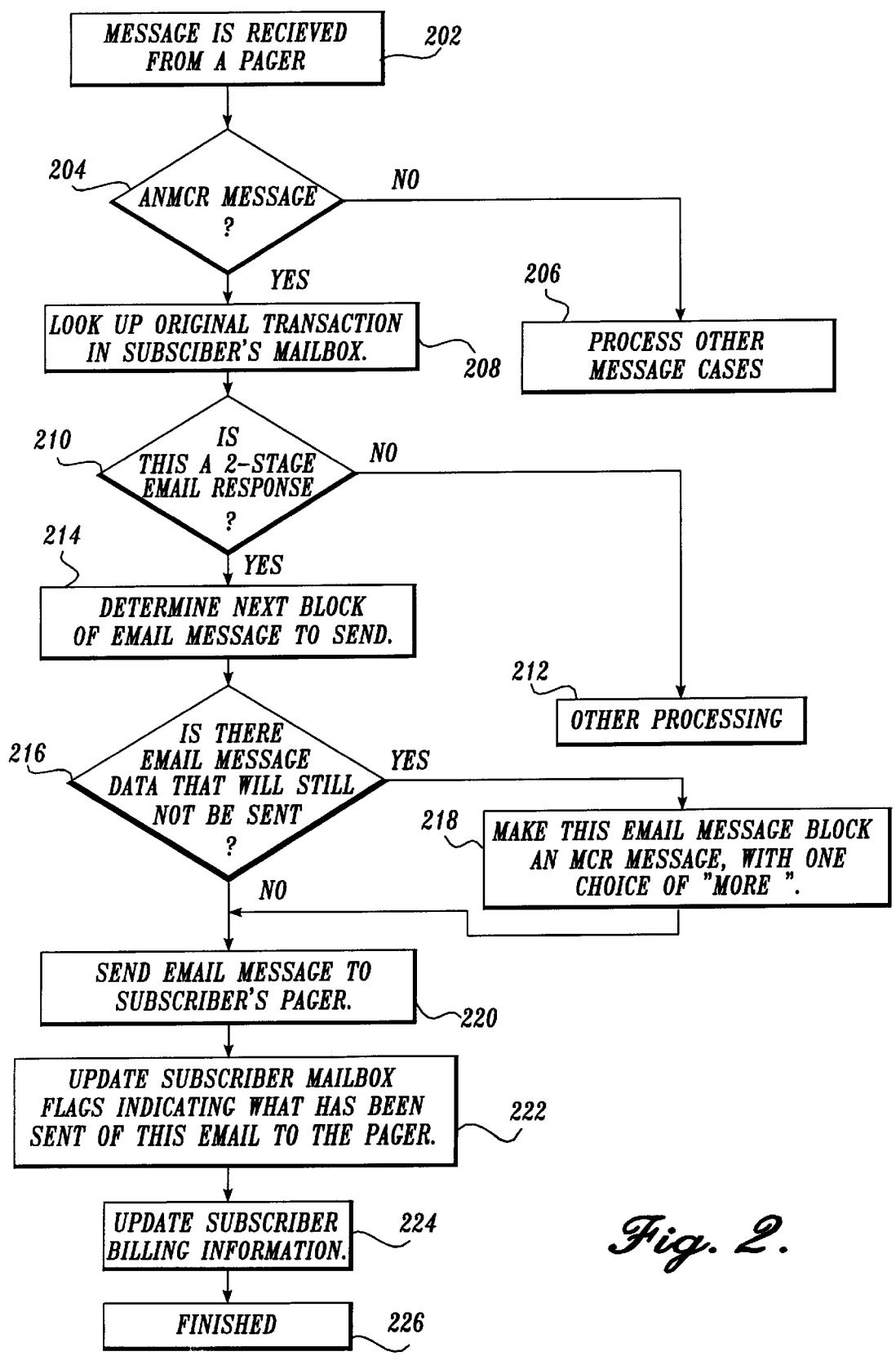
FIG. 2 is a flowchart depicting receipt and processing by a paging infrastructure of MCR responses by a two-way pager to initial and subsequent MCR messages from the paging infrastructure.

Referring to FIG. 2 the receipt and processing by the paging infrastructure of MCR responses by the two-way pager to initial and subsequent MCR messages from the paging infrastructure is shown. At block 202, a message is received from a two-way pager by the paging protocol. The paging protocol, at block 204, ascertains whether the message received from the two-way pager is an MCR message. If the message is not an MCR message, i.e., if the answer to the query is "no" the message is processed in other manners available to the paging protocol at block 206. If, on the other hand, the message is an MCR message, i.e., if the answer to the query is "yes", the paging protocol at block 208, accesses, via the E-mail gateway, the original E-mail data package in the E-mail mail box of the two-way pager subscriber. At block 210 the paging protocol ascertains if the message from the two-way pager is an MCR response to the query for "more" sub-packages of the E-mail data package. If the pager MCR message is not a response to the query for "more" sub-packages of the E-mail data package, i.e., if the answer to the query is "no" the paging protocol performs other processing of the MCR message at block 212. If, on the other hand, the pager MCR message is a response to the query for "more" sub-packages of the E-mail data package, i.e., if the response to the query is "yes," the paging protocol, at block 214, determines the next sub-package of the E-mail data package to send by accessing the original E-mail data package in the E-mail mail box of the two-way pager subscriber via the E-mail gateway. The above is accomplished by ascertaining the location of the mail box flags that were stored at block 120 of FIG. 1. Recall that the original E-mail data package was stored in the E-mail mail box of the two-way pager subscriber with appropriate store flags at block 120 of FIG. 1 that mark which data sub-packages have been transmitted. At block 216 the paging protocol ascertains the size of the E-mail data sub-package that will be sent, and whether, based on the predetermined E-mail data package size limitation, a sub-package of the E-mail data package will remain after transmission of the present portion of the E-mail data package, i.e., the second sub-package. If the answer to this query is "yes" i.e., an additional sub-package of the E-mail data package will remain after transmission of the present sub-package (i.e., the second sub-package) then, at block 218, the present E-mail data sub-package transmission will be transmitted, at block 220, an MCR message with the single choice of "more" as a response along with the appropriate response index for back channel transmission. If, on the other hand, the response to the above query at block 216 is "no", i.e., none of the E-mail data package remains after the present portion sub-package (i.e., the second sub-package) is transmitted, the paging protocol, at block 220, transmits the second sub-package of the E-mail data package to the two-way pager of the subscriber, as a non-MCR message. At block 222, the entire original E-mail data package in the E-mail mail box of the two-way pager subscriber is updated with store flags that indicate the sub-packages of the E-mail data package (e.g., the first sub-package and the second sub-package) that have been transmitted to the two-way pager. At block 224, the billing information of the two-way pager subscriber is updated at block 122 to include the cost associated with the transmission of the second sub-package of the E-mail data package. At block 226, this program terminates.

The above program of FIG. 2 is repeatedly employed every time a pager MCR message is received by the pager protocol indicating an affirmative back-channel response by the two-way pager subscriber to a query for "more" of the E-mail data package until all of the sub-packages of the E-mail data package have been transmitted. If the two-way pager subscriber fails to transmit a back-channel response to the most recent MCR message, the program is not repeated.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for sequential transmission of at least three portions of a data package from an electronic communication transmitter to an electronic communication receiver comprising:

transmitting from the electronic communication transmitter to the electronic communication receiver a first portion of the data package in a form comprehensible to the user of the electronic communication receiver, the first portion of the data package including identifying information pertaining to a second portion of the data package;

having the electronic communication receiver provide the user thereof with a choice of whether to have the second portion of the data package transmitted by the electronic communication transmitter;

transmitting from the electronic communication receiver transmission instructions to the electronic communication transmitter in response to an affirmative selection by the user of the electronic communication receiver to the choice of whether to have the second portion of the data package transmitted;

transmitting from the electronic communication transmitter the second portion of the data package upon receipt by the electronic communication transmitter of the transmission instructions from the electronic communication receiver, wherein the second portion of the data package is in a form comprehensible to the user of the electronic communication receiver, the second portion of the data package not being required to include identifying information pertaining to the first portion of the data package;

upon transmitting the second portion of the data package, having the electronic communication receiver provide the user thereof with a choice of whether to have the third portion of the data package transmitted by the electronic communication transmitter;

transmitting from the electronic communication receiver transmission instructions to the electronic communication transmitter in response to an affirmative selection by the user of the electronic communication receiver to the choice of whether to have the third portion of the data package transmitted; and transmitting from the electronic communication transmitter the third portion of the data package upon receipt by the electronic communication transmitter of the transmission instructions from the electronic communication receiver, wherein the third portion of the data package is in a form comprehensible to the user of the electronic communication receiver, the third portion of the data package not being required to include identifying information pertaining to the second portion of the data package.

2. The method of claim 1 further comprising:
receiving the second portion of the data package at the electronic communication receiver.

3. The method of claim 1 further comprising:
receiving the second portion of the data at a receiving device other than the electronic communication receiver.

4. The method of claim 3 wherein the receiving device other than the electronic communication receiver is an electronic voice mail box and the second portion of the data package is a voice message or a text-to-voice message.

5. The method of claim 3 wherein the receiving device other than the electronic communication receiver is a facsimile machine and the second portion of the data package is a facsimile transmission.

6. The method of claim 3 wherein the receiving device other than the electronic communication receiver is an electronic text mail box and the second portion of the data package is a text message.

7. The method of claim 1 wherein the electronic communication receiver is a pager.

8. The method of claim 1 wherein the identifying information of the first portion of the data package denotes at least one of the subject, originating entity, originating location, data size, portion of the content, file name and file type of the second portion of the data package.

9. The method of claim 1 further comprising:
sending additional data packages from the transmitter to the receiver;
evaluating the additional data packages to determine if they are smaller than a predetermined block size; and
if a given additional data package is smaller than the predetermined block size, transmitting the entire additional data package from the transmitter to the receiver.

10. A method for sequential transmission of at least three portions of a data package from an electronic communication transmitter to an electronic communication receiver comprising:

transmitting from the electronic communication transmitter to the electronic communication receiver a first portion of the data package in a form comprehensible to the user of the electronic communication receiver, the first portion of the data package including identifying information pertaining to a second portion of the data package;

having the electronic communication receiver provide the user thereof with a choice of whether to have the second portion of the data package transmitted by the electronic communication transmitter;

transmitting from the electronic communication receiver transmission instructions to the electronic communication transmitter in response to an affirmative selection by the user of the electronic communication receiver to the choice of whether to have the second portion of the data package transmitted;

transmitting from the electronic communication transmitter to the electronic communication receiver the second portion of the data package upon receipt by the electronic communication transmitter of the transmission instructions from the electronic communication receiver, wherein the second portion of the data package is in a form comprehensible to the user of the electronic communication receiver, the second portion of the data package not being required to include identifying information pertaining to the first portion of the data package;

upon transmitting the second portion, having the electronic communication receiver provide the user thereof with a choice of whether to have the third portion of the data package transmitted by the electronic communication transmitter;

transmitting from the electronic communication receiver transmission instructions to the electronic communication transmitter in response to an affirmative selection by the user of the electronic communication receiver to the choice of whether to have the third portion of the data package transmitted; and transmitting from the electronic communication transmitter to the electronic communication receiver the third portion of the data package upon receipt by the electronic communication transmitter of the transmission instructions from the electronic communication receiver, wherein the third portion of the data package is in a form comprehensible to the user of the electronic communication receiver, the third portion of the data package not being required to include identifying information pertaining to the second portion of the data package.

11. The method of claim 10 wherein the electronic communication receiver is a pager.

12. The method of claim 10 wherein the identifying information of the first portion of the data package denotes at least one of the subject, originating entity, originating location, data size, portion of the content, file name and file type of the second portion of the data package.

13. A method for sequential transmission of at least three portions of a data package from an electronic communication transmitter to an electronic communication receiver comprising:

transmitting from the electronic communication transmitter to the electronic communication receiver a first portion of the data package in a form comprehensible to the user of the electronic communication receiver, the first portion of the data package including identifying information pertaining to a second portion of the data package;

having the electronic communication receiver provide the user thereof with a choice of whether to have the second portion of the data package transmitted by the electronic communication transmitter;

transmitting from the electronic communication receiver transmission instructions to the electronic communication transmitter in response to an affirmative selection by the user of the electronic communication receiver to the choice of whether to have the second portion of the data package transmitted;

transmitting from the electronic communication transmitter to a receiving device other than the electronic communication receiver the second portion of the data package upon receipt by the electronic communication transmitter of the transmission instructions from the electronic communication receiver, wherein the second portion of the data package is in a form comprehensible to the user of the electronic communication receiver, the second portion of the data package not being required to include identifying information pertaining to the first portion of the data package;

upon transmitting the second portion, having the electronic communication receiver provide the user thereof with a choice of whether to have the third portion of the data package transmitted by the electronic communication transmitter;

transmitting from the electronic communication receiver transmission instructions to the electronic communication transmitter in response to an affirmative selection by the user of the electronic communication receiver to the choice of whether to have the third portion of the data package transmitted; and transmitting from the electronic communication transmitter to a receiving device other than the electronic communication receiver the third portion of the data package upon receipt by the electronic communication transmitter of the transmission instructions from the electronic communication receiver, wherein the third portion of the data package is in a form comprehensible to the user of the electronic communication receiver, the third portion of the data package not being required to include identifying information pertaining to the second portion of the data package.

14. The method of claim 13 wherein the receiving device other than the electronic communication receiver is an electronic voice mail box and the second portion of the data package is a voice message or a text-to-voice message.

15. The method of claim 13 wherein the receiving device other than the electronic communication receiver is a facsimile machine and the second portion of the data package is a facsimile transmission.

16. The method of claim 13 wherein the receiving device other than the electronic communication receiver is an electronic text mail box and the second portion of the data package is a text message.

17. The method of claim 13 wherein the electronic communication receiver is a pager.

18. The method of claim 13 wherein the identifying information of the first portion of the data package denotes at least one of the subject, originating entity, originating location, data size, portion of the content, file name and file type of the second portion of the data package.

19. A method for wireless transmission of an alphanumeric message having at least a first portion, a second portion, and a third portion from an electronic communication transmitter to an electronic communication receiver, the method comprising:

transmitting from the electronic communication transmitter to the electronic communication receiver the first portion of the alphanumeric message, the first portion being an initial portion of the alphanumeric message;

having the electronic communication receiver provide a user thereof with the first portion in a form comprehensible to the user;

having the electronic communication receiver provide the user thereof with a choice of whether to receive the second portion;

transmitting from the electronic communication receiver transmission instructions to the electronic communication transmitter in response to an affirmative selection by the user of the electronic communication receiver to the choice of whether to have the second portion;

transmitting from the electronic communication transmitter the second portion in response to the transmission instructions from the electronic communication receiver, the electronic communication receiver providing the user thereof with the second portion in a form comprehensible to the user;

having the electronic communication receiver provide the user thereof with a choice of whether to receive the third portion;

transmitting from the electronic communication receiver transmission instructions to the electronic communication transmitter in response to an affirmative selection by the user of the electronic communication receiver to the choice of whether to have the third portion; and transmitting from the electronic communication transmitter the third portion in response to the transmission instructions from the electronic communication receiver, the electronic communication receiver providing the user thereof with the third portion in a form comprehensible to the user.

20. The method of claim 19, wherein the alphanumeric message is an e-mail message, a voice message, a text-to-voice message, a facsimile transmission or a text message.

21. The method of claim 19, wherein the alphanumeric message is an e-mail.

* * * * *

UNITED STATES PATENT AND TRADEMARK OFFICE
CERTIFICATE OF CORRECTION

PATENT NO. : 6,240,088 B1　　　　　　　　　　　　　　　　　　　　　　　Page 1 of 1
DATED : May 29, 2001
INVENTOR(S) : D.W. Gayton et al.

It is certified that error appears in the above-identified patent and that said Letters Patent is hereby corrected as shown below:

<u>Column 7,</u>
Line 24, "of the data" should read -- of the data package --

<u>Column 10,</u>
Lines 47 and 50, "claim 19," should read -- claim 19 --

Signed and Sealed this

Eleventh Day of December, 2001

Attest:

NICHOLAS P. GODICI
*Attesting Officer*　　*Acting Director of the United States Patent and Trademark Office*